United States Patent [19]

Oyamada et al.

[11] Patent Number: 5,659,772

[45] Date of Patent: Aug. 19, 1997

[54] METHOD FOR CUSTOMIZING KANA-KANJI CONVERSION SYSTEM AND KANA-KANJI CONVERSION SYSTEM

[75] Inventors: Rika Oyamada, Yamato; Seiji Yuge, Yokohama; Masami Tada, Sagamihara, all of Japan

[73] Assignee: IBM Corporation, Armonk, N.Y.

[21] Appl. No.: 378,303

[22] Filed: Jan. 25, 1995

[30] Foreign Application Priority Data

Jan. 26, 1994 [JP] Japan ..................... 6-007114

[51] Int. Cl.$^6$ ........................... G06F 15/00
[52] U.S. Cl. ........................... 395/797
[58] Field of Search ............... 395/797, 12, 62, 395/798; 364/419.02, 419.03, 419.04, 419.08, 419.1

[56] References Cited

U.S. PATENT DOCUMENTS 5,594,642  1/1997  Collins et al. ................ 395/797

*Primary Examiner*—Phu K. Nguyen
*Attorney, Agent, or Firm*—Edward H. Duffield

[57] ABSTRACT

A plurality of customization files, each including customizing information of a kana-kanji conversion system and display information corresponding to the customizing information, is prepared. A customization file selected from the plurality of customization files is opened (step 100), a window showing the selected customization file is displayed on a CRT, and customization is performed in an interactive way in accordance with user's instructions (step 104). The customized customization file is saved as a new file. When a kana-kanji conversion program is used, the display information of the selected customization file is displayed at an arbitrary predetermined position (preferably, in the lowest line) within the window displayed on the CRT.

13 Claims, 7 Drawing Sheets

FIG. 4

| Writing Heads | CUSTOMIZATION FILE SELECTION |

EXPLANATION

FOR OYAMADA
FOR KANA INPUT
FOR ROMAN-CHARACTER INPUT
NATIVE USER INTERFACE
SAMPLE A-USER INTERFACE

☐ FILE NAME INDICATION (F)

| SAVE (H) | TEMPORARILY SET (I) | CANCEL |

FIG. 6

Writing Heads CUSTOMIZE-D: ¥WHWIN¥ROMAJI.CUS

FILE(F)   EDIT (E)   RELATED FUNCTIONS (R)   HELP (H)

| COMMENTS: | FOR ROMAN-CHARACTER INPUT |
| INDICATOR: | ROMAN-CHARACTERS |
| DICTIONARY PROFILE NAME: | d:¥whwin¥WHDCT.PRO |
| LEARNING DICTIONARY NAME: | d:¥whwin¥WHLEARN.DCT |
| ROMAN-CHARACTER CONVERSION SETTING: | ● Writing Heads SPECIFICATION    ○ IBM SPECIFICATION |

SET(S)···

5,659,772

METHOD FOR CUSTOMIZING KANA-KANJI CONVERSION SYSTEM AND KANA-KANJI CONVERSION SYSTEM

FIELD OF THE INVENTION

The present invention relates to a method for customizing a kana-kanji conversion system and to a kana-kanji conversion system, and particularly to a kana-kanji conversion system which effects multi-window processing and to a method for customizing a kana-kanji conversion system which is suitable for a kana-kanji conversion system effecting multi-window processing.

DESCRIPTION OF THE PRIOR ART

Conventionally, a kana-kanji conversion program enables a user to customize the selection of kana input or Roman-character input, the setting of a conversion mode such as first-reading, the selection of a dictionary to be used, the setting of spot conversion or home-position conversion, and the like.

Further, in a case in which one system is used by a plurality of users, it is advantageous for different customizations for a program to be enabled for each of individual users and for one system to be used by switching a mode for each of the individual users. For this reason, the following prior arts are known.

Japanese Patent Application Laid-Open No. 2-289037 discloses a kana-kanji conversion system in which a system-shared kana-kanji conversion dictionary and a plurality of kana-kanji conversion dictionaries which exist for their respective purposes of use are prepared, and control means for controlling these kana-kanji conversion dictionaries is further provided.

Japanese Patent Application Laid-Open No. 4-148465 discloses a Japanese word processor having a kana-kanji converting function in which an individual user's name registration portion, which registers the names of users, and an individual user's name priority retrieval portion, which rearranges learning tables in accordance with the priorities of the registered individual users' names, are provided.

Japanese Patent Application Laid-Open No. 5-204922 discloses information processing equipment such as a word processor and a personal computer. In the information processing equipment, during a turn-on time of a power source, a message for selecting whether the owner or another person is using the equipment is displayed on a display. If the choice that the owner is using the equipment is selected, data is read out from a user information storing portion for the owner and then is processed. Further, if the choice that another person is using the same equipment is selected, data is read out from a user information storing portion for others. As a result, modification of the registered-contents of the owner, which may be caused by another person using the same equipment, is prevented.

Further, in personal computers, with the remarkable improvements in system performance and the lowering of costs of hardware, there has recently been increase in the number of users who use a multi-window system such as "OS/2" (trademark of International Business Machines Corporation) and "Windows" (trademark of Microsoft Inc.). In such systems, there is known a method which is capable of customizing a kana-kanji conversion system independently for each individual window session. According to this method, it is possible to, for example, write a paper on organic chemistry using a dictionary specialized for chemical terms in a first window, and prepare an address list using a dictionary specialized for names of places in a second window.

However, in the above-described prior arts, although it is possible to select and set one of various customization modes, in order to realize which customization mode is actually set, it is necessary to use, for example, a method to test whether a kana-kanji conversion of a specified combination of kanji can be effected or not. This results in the user becoming confused while operating the personal computer.

Further, in a multi-window system as well, a user cannot easily confirm what customization mode is currently set and whether the set mode has been validated. Therefore, in a multi-window system in which a large number of window sessions exists, the user becomes even more confused.

In order to solve the aforementioned, it is an object of the present invention to allow a user to easily confirm, in a kana-kanji conversion system, the customization mode which is currently set.

Further, another object of the present invention is to allow a user to easily confirm, in a multi-window system, the customization mode of a kana-kanji conversion system, which is currently set, for each of individual windows.

SUMMARY OF INVENTION

In order to achieve the above-described objects, the present invention is a method and system for customizing a kana-kanji conversion system including a processor unit and a display device connected to the processor unit and performing a kana-kanji conversion process. The method comprises the steps of: (a) preparing a plurality of customization files each including customizing information of the kana-kanji conversion system and display information corresponding to the customizing information; (b) enabling selection of one of said plurality of customization files; (c) enabling modification of at least one of customizing information and display information of said selected customization file; and (d) displaying said display information of said selected customization file at a predetermined position of a screen of said display device.

In the present invention, in order to customize the kana-kanji conversion system which is equipped with a processor unit and a display device connected to the processor unit and which performs a kana-kanji conversion process, a plurality of customization files each including customizing information of the kana-kanji conversion system and display information corresponding to the customizing information is prepared. One of the plurality of customization files can be selected, and at least one of the customizing information and the display information of the selected customization file can be modified. Thus, when at least one of customizing information and display information can be modified, the kana-kanji conversion system can be customized.

The display information in the selected customization file is displayed at a predetermined position of a screen of the display device, for example, at at least any one place on the screen, such as the lowermost line, the uppermost line, the right-hand end, the left-hand end, or the like. Thus, since the display information corresponding to the customizing information is displayed on the screen, a user can visually confirm a customization mode easily.

The customization information of the present invention can include information which specifies either kana input or Roman-character input. This makes it possible to select either kana input or Roman-character input.

The display information of the present invention can include information for identifying a person who effects customization, such as the name, code, and symbol of the person who customizes. As a result, the user can easily, visually confirm the person who effects customization.

The invention is effective when invoking and interactive editing of one of the plurality of customization files is enabled, and the edited contents can be saved as a new customization file. This interactive editing of the customization file allows easy customization.

Further, in order to customize a kana-kanji conversion system performing a kana-kanji conversion process and equipped with a processor unit capable of effecting multi-window processing and equipped with a display device which is connected to the processor unit and in which provided a multi-window is displayed by multi-window processing, a plurality of customization files each including customizing information of the kana-kanji conversion system and display information corresponding to the customizing information is prepared in the same way as in the present invention described above. Further, selection of one of the plurality of customization files is enabled in each window, modification of at least one of customizing information and display information of the selected customization file is enabled in each window, and for each window, the display information of the selected customization file is displayed at respective predetermined positions within the windows displayed in the display device.

Since the present invention makes it possible to, for each window of the display device, select the customization file and modify at least one of the customizing information and the display information, the user can easily, visually confirm the customization mode which is currently set, for each of the individual windows.

In the present invention, in the same way as in the present invention, the display information can include information which identifies a person who effects customization, and described in claim 5 the present invention described in claim 5 can comprise the steps of enabling invoking and interactive editing of one of the plurality of customization files, and enabling saving of the edited contents as a new customization file. The step of invoking and interactive editing of one of the plurality of customization files may be provided as an independent window session. Further, the step of invoking and interactive editing of one of the plurality of customization files may be provided as a dialog box within each of the individual windows.

BRIEF DESCRIPTION OF THE DRAWINGS

FIG. 4 is a diagram which shows a customization file selection panel.

FIG. 6 illustrates a window showing contents of the customization file.

FIG. 7 is a flow diagram of a routine which is initiated when a kanji key is pressed or the like.

DESCRIPTION OF THE PREFERRED EMBODIMENT

Referring now to the accompanying drawings, an embodiment of the present invention will be described in detail. This embodiment shows the construction of a kana-kanji conversion system using a personal computer.

Figure 1:
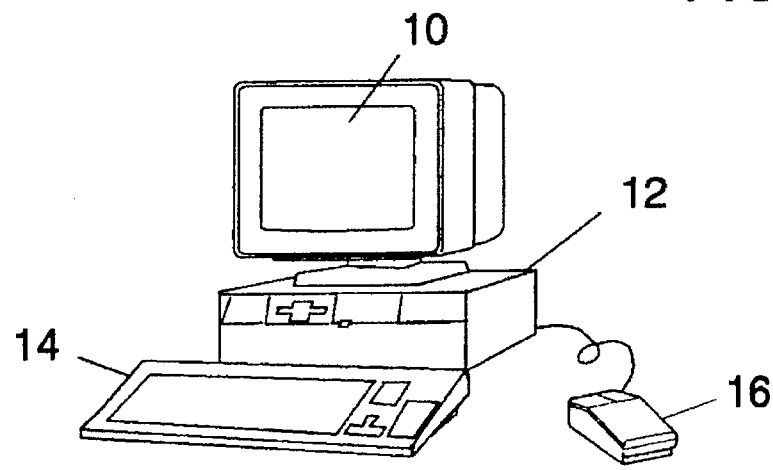
FIG. 1 is a schematic diagram of an embodiment of the present invention.

As illustrated in FIG. 1, the present embodiment includes an APA (all points addressable) CRT 10, a system unit 12, a keyboard 14; and a mouse 16. The system unit 12 is provided with a hard disk device having a hard disk and a hard disk drive (HDD), a floppy disk drive (FDD), a CPU, and a system memory formed from a RAM and a ROM.

Figure 2:
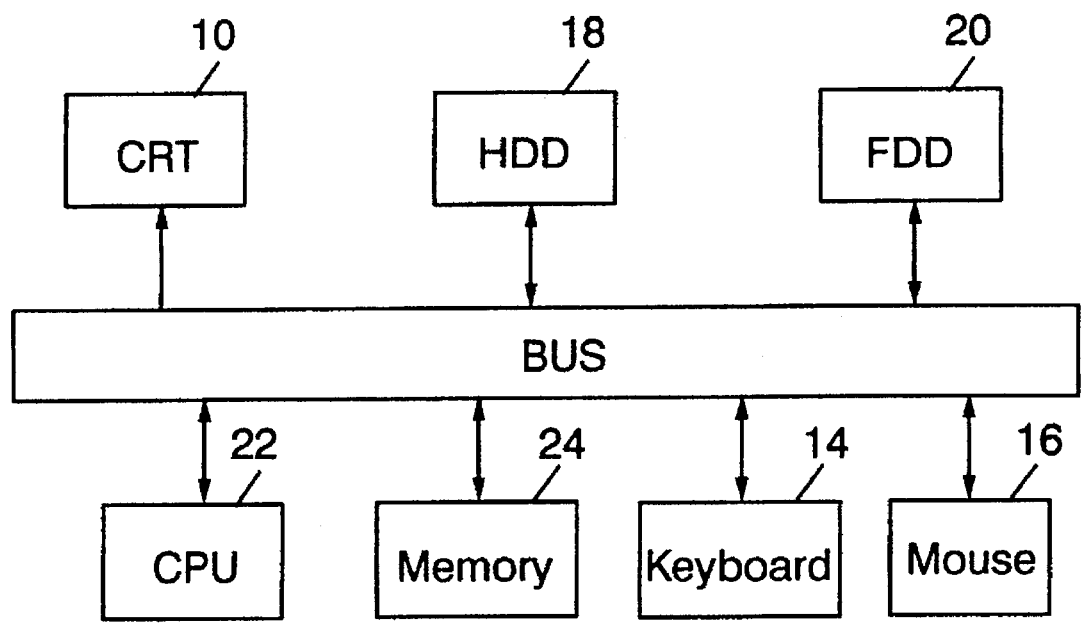
FIG. 2 is a block diagram of the embodiment shown in FIG. 1.

The CRT 10, keyboard 14, mouse 16, hard disk drive 18, floppy disk drive 20, CPU 22, and system memory 24 are, as illustrated in FIG. 2, connected to each other via a system bus including an address bus, data bus, and control bus.

As CPU 22, for example, Intel Corporation's "80386", "80486", "Pentium" (trademark of Intel Corporation), or the like, can be used. In the hard disk, an operating system (OS) which implements a multi-window such as Windows, OS/2, or the like, is stored. During booting of the system unit, the operating system is loaded into RAM of the system memory 24.

Further, when a kana-kanji conversion program for use with the kana-kanji conversion system of the present embodiment is stored in the hard disk and the operating System is loaded into the system memory 24, the kana-kanji conversion program is also loaded into the system memory 24 in accordance with a specific setting, or the kana-kanji conversion program is loaded into the system memory 24 in response to a specific operation of an operator, such as double-clicking of a specific icon. The kana-kanji conversion program is stored in a floppy disk and is then read in by the floppy disk drive 20.

In addition, a plurality of dictionary files utilized by the kana-kanji conversion program of the present embodiment, a plurality of customization files, and a start-up time reference file which is referred to during a start-up time are also stored in the hard disk.

One of the plurality of customization files is shown in Table 1 as an example.

TABLE 1

*For input of Roman-characters
/IND="Roman character"
/MDP=d:¥whwin¥WHDCT.PRO
/UDC=d:¥whwin¥WHLEARN.DCT
/FNC=d:¥whwin¥ROMAJI.FNC
/RTB=d:¥whwin¥ROMAJI.RTB
/CHR=d:¥whwin¥ROMAJI.CHR In Table 1, the text beginning with the mark "*" in the first line of this customization file is a comment.

The file specified by "/IND=" in the second line is kanji indicator information which is display information. This kanji indicator information is preferably displayed in the lowermost line of each individual window screen of a multi-window. This kanji indicator information may be, for example, names for identifying customized users in charge, such as "For Tanaka" and "For Ozawa", functions such as "IBM MKK style" and "For input of special Roman characters", specified dictionaries such as "For input of chemical terms", "For input of atomic energy terms", or the like, and an input form such as "Roman-character input", "Kana input" or the like. The kanji indicator information is described by a user by a customizing method which will be described below. In Table 1, as the kanji indicator information, "Roman character" is specified. This means that a person who created the customization file intends that the customization by the customization file be suitable for a style of inputting special Roman characters. It should be noted that, even if, in a state in which this customization file is selected, the Roman-character input mode is switched to a kana input mode by, for example, pressing a "front" key and "hiragana" key at the same time, the character "R" which represents the Roman-character input mode merely disappears, which does not mean that the indicator information of "Roman character" displayed in the lowermost line within the window is switched to "kana input".

The file specified by "/MDP=" in the third line is a multi-dictionary profile in which a specified multi-dictionary profile name is described.

The file specified by "/UDC=" in the fourth line is a learning dictionary file, in which a specified learning dictionary name, i.e., a so-called user-defined dictionary name, is described. Phrases and their readings registered by the user at an arbitrary point in time are accumulated in the learning dictionary file.

The file specified by "/FNC=" in the fifth line is a function definition file. The function definition file is used to specify a kana-kanji converting function such as first-reading, batch conversion, or automatic determination which is made by inputting "(period mark)".

The file specified by "/RTB=" in the sixth line is a Roman-character definition file. The Roman-character definition file is used to define that, for example, in the Roman-character input mode, the hiragana character " ち " is inputted by "ti" or "chi", the hiragana character " ん " is inputted by "xn" or "nn", or the like.

The file specified by "/CHR=" in the seventh line is a non Roman-character definition file. The non Roman-character definition file is used to define that, when, in a hiragana input mode, a shift key and the " " key are pressed at the same time, "*" is inputted rather than " "

Each line of the customization file is represented in an ordinary text file as illustrated in Table 1. However, each customization file may be represented in a particular binary form, and it suffices that the customization file can be represented in accordance with the specification of a customization file-reading portion of the kana-kanji conversion program.

Next, an example of a start-up time reference file is shown in Table 2.

TABLE 2

[Install]
InstDir=d:¥whwin
User=Rika Oyamada
[Editor]
DefProfileName=d:¥whwin¥ROMAJI.CUS In the reference file shown in Table 2, the content described in "InstDir=" of [Install] is a directory of a file in which the kana-kanji conversion system of the present embodiment is introduced. This file includes other start-up time reference files, a plurality of customization files, or the like.

The content described in "User=" is a name of a registered user, which is input at the time of introduction of the kana-kanji conversion system of the present embodiment.

The content described in "DefProfileName=" is a name of the start-up time reference file.

Namely, the start-up time reference file is created when the kana-kanji conversion system of the present embodiment is introduced, and the start-up time reference file is updated when the customization file is selected and modified. Then, the name of the start-up time reference file described in "DefProfileName=" is renamed.

Figure 3:
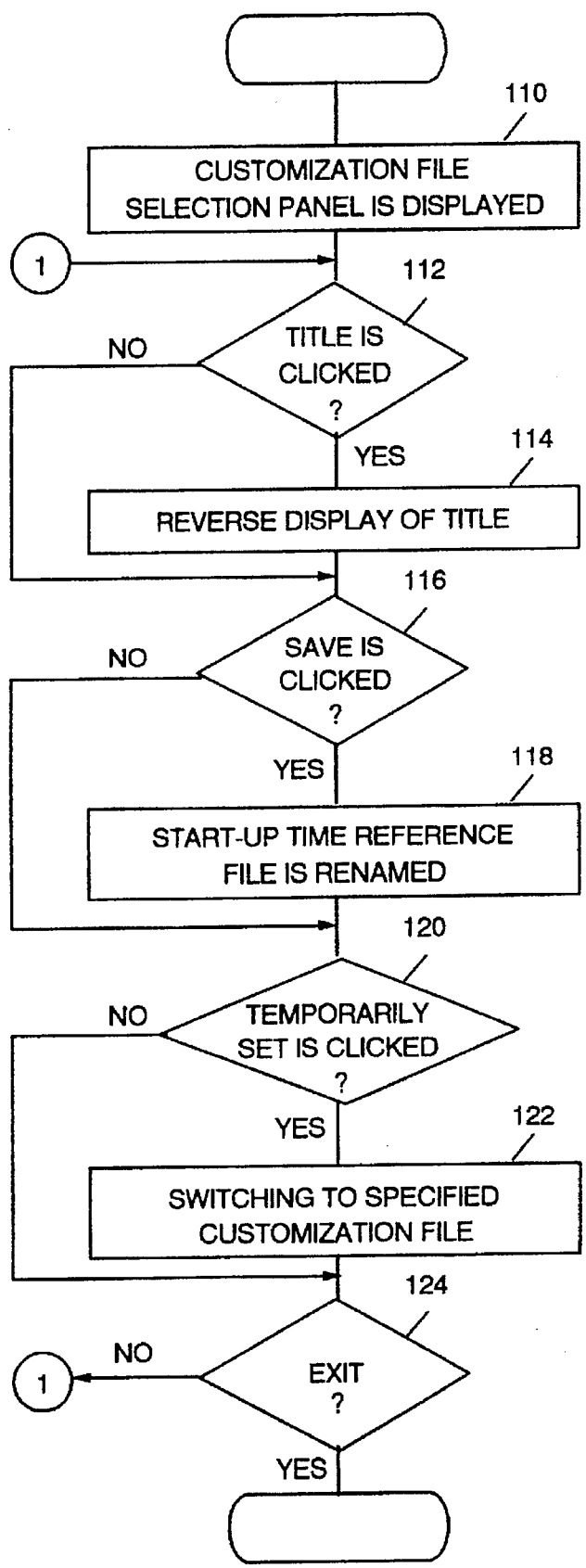
FIG. 3 is a flow diagram illustrating a routine for modifying a specified customization file.

Next, a control processing routine of the present embodiment will be described. When a routine for modifying the specified customization file which is shown in FIG. 3 is initiated by double-clicking a predetermined icon, or by clicking an item of a title bar on a predetermined window displaying a pull-down menu to select a menu, in step 110, a customization file selection panel which is the window shown in FIG. 4 is displayed on a CRT to select one of a plurality of customization files.

In the "Explanation" of this customization file selection panel, a title which corresponds to a customizable "Comment" portion in a window shown in FIG. 6 which will be described later, is displayed. By selecting a title such as "For Oyamada" and "For Roman-character input" which is displayed in the "Explanation", it is possible to switch the designation of the customization file. The title can be selected by operating a mouse and positioning a cursor to a title to be selected, and clicking the title. In step 112, when it is determined that a title of a customization file selection panel was clicked, reverse display of the clicked title is effected in step 114. As a result, the selected title can be confirmed. The title "For Oyamada" represented with reverse display in FIG. 4 indicates the title of the customization file currently being selected. This title is displayed in the "Comments" section.

Further, when a check box of "☐ File name indication (F)" on the customization file selection panel is clicked, a file name can also be displayed together with a title name.

Moreover, when a large number of customization files exists and all of these files are not displayed in the "Explanation" section of the customization file selection panel, a title list of the customization files can be scrolled vertically by clicking a scroll bar located at the right-hand end of the window shown in FIG. 4.

Here, when "Save (H)" is clicked, the process proceeds from step 116 to step 118. In step 118, information relating to a customization file which corresponds to a selected title is reflected on the reference file which has the contents shown in Table 2 and which is stored in a hard disk, so that the name of the start-up time reference file in the reference file is renamed.

On the other hand, when "Temporary setting (I)" is clicked, the process proceeds from step 120 to step 122. In step 122, the display is switched to a customization file corresponding-to a temporarily-selected title. However, the contents of the reference file are not updated. Accordingly, when the power source is temporarily turned off and the system is again turned on, or when the window system is temporarily terminated and is then started again (the latter assumes Windows), the process returns to the designation of the customization file.

The above-described processes are repeated until it is determined that the routine has ended in step 124.

Figure 5:
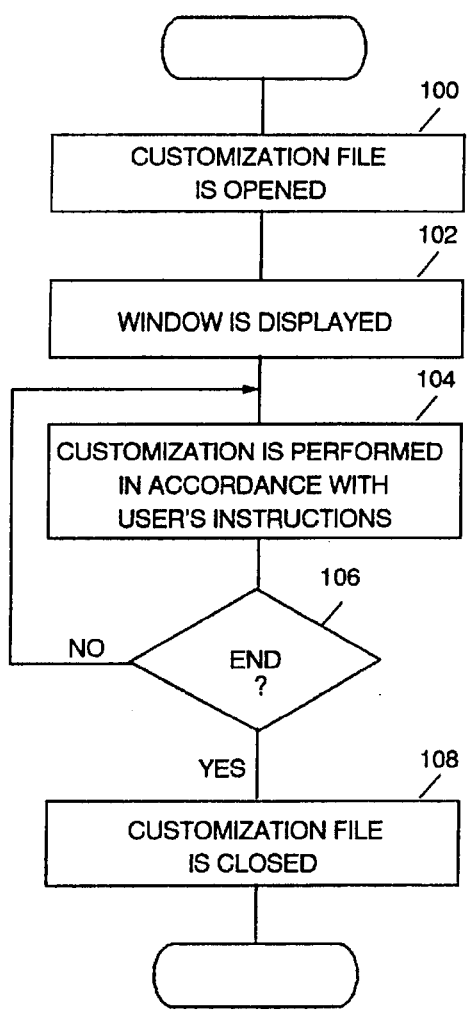
FIG. 5 is a flow diagram which shows a utility for customizing a customization file.

FIG. 5 shows a customization utility which is a program for customizing a customization file, the customization utility being initiated by double-clicking a predetermined icon, or by clicking an item of a title bar on a predetermined window displaying a pull-down menu to select a menu.

When this utility is initiated, in step 100, the customization file specified in the routine shown in FIG. 3 is opened.

In the next step 102, the window shown in FIG. 6, which indicates the contents of the customization file, namely, a dialog box, is displayed on the CRT. As a result, customization can be performed in accordance with the user's instructions. In this case, the customization means that the contents of the dialog box are rewritten in accordance with the user's instructions, and that the rewritten contents are saved a file of a different name.

In FIG. 6, the contents described in the "Comments" section become a title when one of the plurality of customization files is selected. In this case, the text which starts with the mark indicated by "*" in Table 1 is displayed (in the above-described example, "For input of Roman characters" is displayed). The contents described in the "Comments" section can be modified by the routine for modifying the specified customization file, which was explained with reference to FIG. 3.

Figure 8:
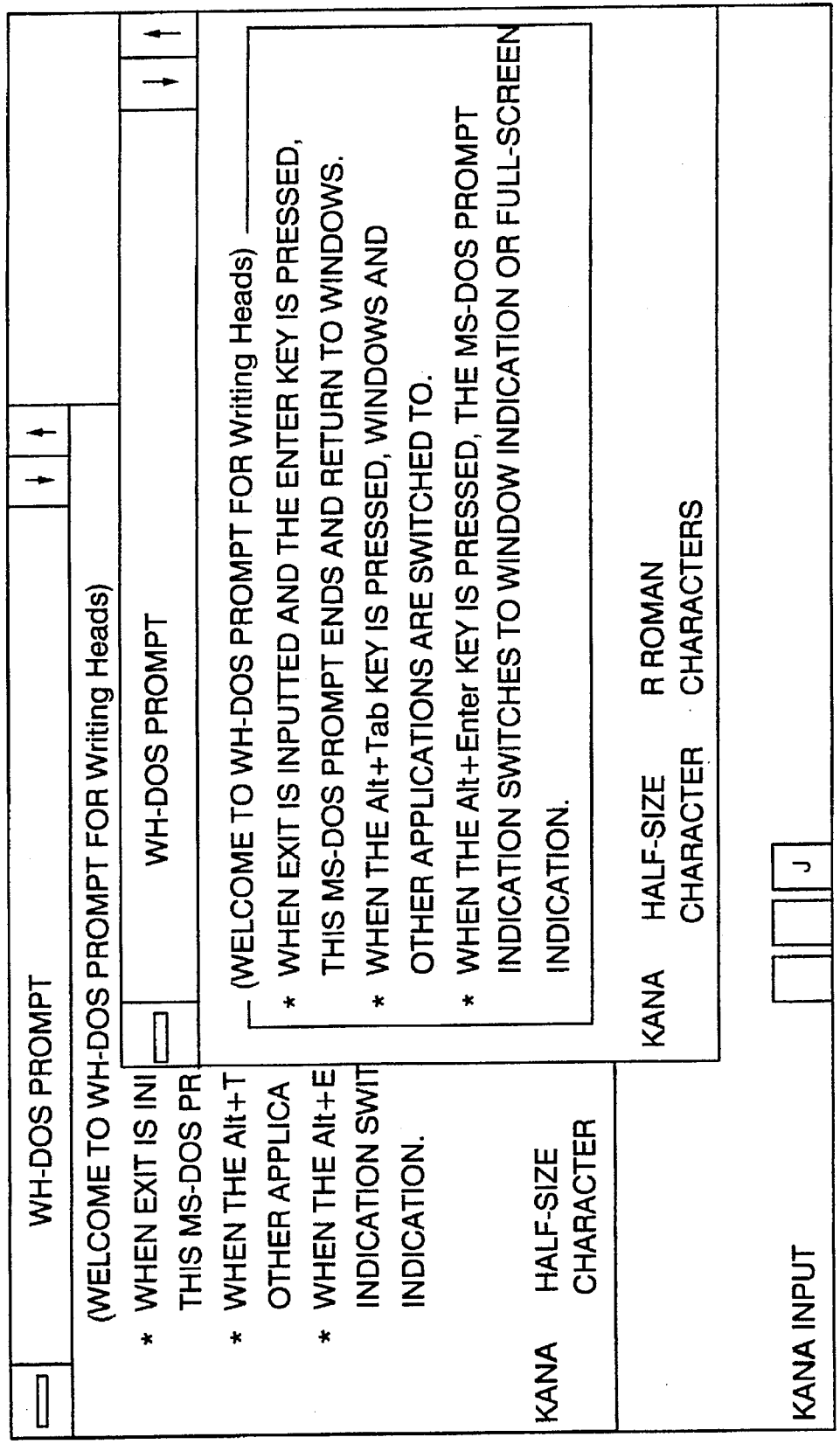
FIG. 8 is a diagram showing a DOS prompt window.

The contents described in the "Indicator" section is kanji indicator information which is displayed as a kanji indicator at the time of pressing a kanji key, for example, on the lowermost line of a window in which the customization file becomes valid (see FIG. 8).

In respective sections of a dictionary profile name and a learning dictionary name, dictionary file names are respectively listed. The kana-kanji conversion program is used to retrieve corresponding vocabulary from the plurality of dictionary files, or to select and list a plurality of words.

In FIG. 6, when "Setting (S) . . . " is clicked, another customization, such as selection of the function definition file or Roman-character definition file shown in Table 1, can be performed.

The user can click the "File (F)" in the title bar shown in FIG. 6 to display a pull-down menu (not shown) on the screen, and Call, for example, save or cancel a file by selecting a desired item from "Save", "Save as", "Cancel", "Exit", and the like. Thus, since the present embodiment makes it possible to invoke one of the plurality of customization files to display a dialog box on the screen, and to edit the invoked customization file in an interactive way, customization can be easily performed. The edited contents (customized file) are saved as a new customization file by selecting "Save".

When it is determined that "Exit" has been selected in step 106, the customization file is closed in step 108.

Figure 7:
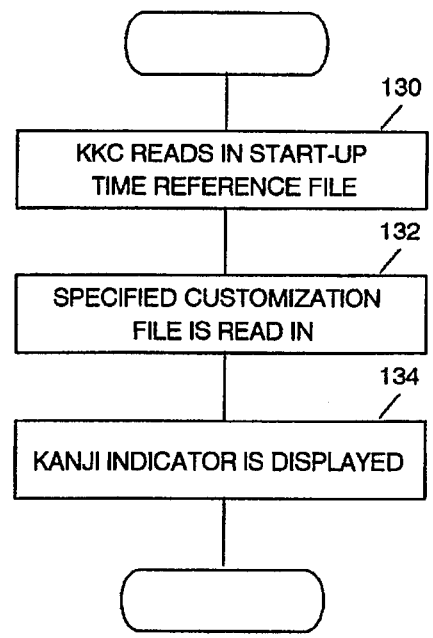

When a particular DOS prompt window (see FIG. 8) is initiated, or when a kanji key is pressed in a state in which a particular DOS prompt window is displayed, the routine shown in FIG. 7 is initiated. In step 130, a KKC (kana-kanji conversion program) reads in the start-up time reference file, reads a customization file name set in the start-up time reference file. In step 132, the KKC reads the contents of the specified customization file. Then, the KKC reads kanji indicator information, dictionary profile, definition file, or the like, from the customization file. In step 134, the KKC displays the contents of the kanji indicator in the lowermost line of the window, and at the same time, effects kana-kanji conversion processing in accordance with the dictionary profile, definition file, or the like.

As a result, the user can easily confirm the customization mode of the kana-kanji conversion system which is currently set, for each of the individual windows.

Figure 9:
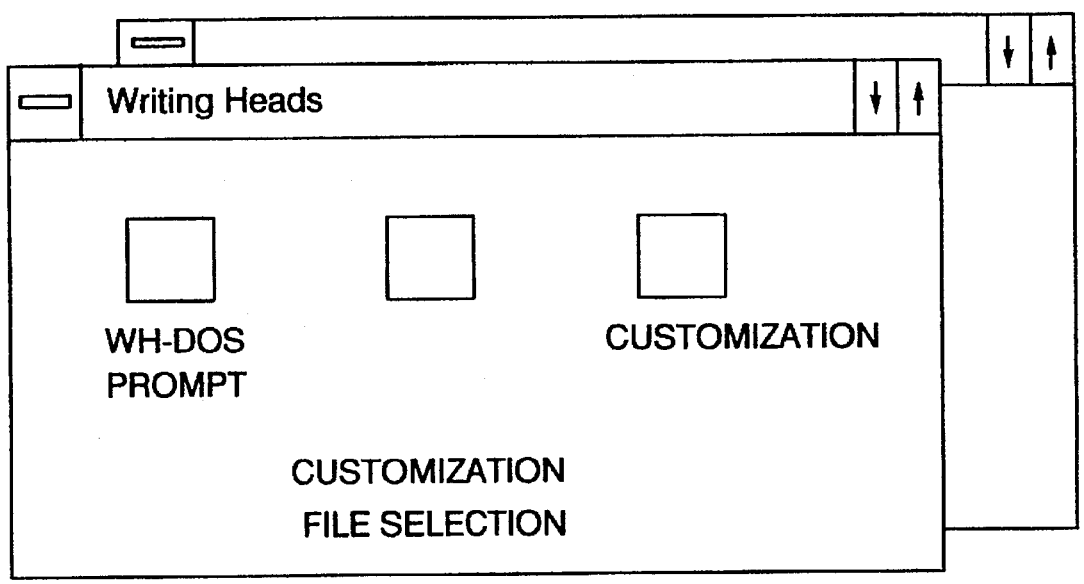
FIG. 9 is a diagram showing an example of a group of kana-kanji conversion program of the present invention.

The DOS prompt window shown in FIG. 8 is created as follows. First, in the case of Windows, when the kana-kanji conversion program of the present embodiment is introduced, a group window named, e.g., "Writing Heads" (trademark of International Business Machines Corporation), is displayed. In this case, various applications are stored, as individual icons, in a group named "Application". Further, Windows is usually provided with an icon of a DOS prompt. When double-clicking of this icon is effected, a window (or an entire screen), which shows the DOS prompt of "C:¥>" and in which an ordinary DOS application can run, is opened. FIG. 9 illustrates an example of a group (provisionally called Writing Heads) of the kana-kanji conversion program of the present embodiment. As can be seen from FIG. 9, WH-DOS prompt icon exists. When double-clicking of this icon is effected, a window called WH-DOS prompt shown in FIG. 8 is opened, and the kana-kanji conversion program of the present embodiment can be utilized within the WH-DOS prompt window.

The start-up time shown in FIG. 7 indicates, in one embodiment of Windows, the time of creating the WH-DOS prompt window. A customization file set at the time of creating this WH-DOS prompt window is read in, and is set in the WH-DOS prompt. Then, a kanji indicator within the read-in customization file is displayed in the WH-DOS prompt, as "For Oyamada", "Roman character", or the like, shown in FIG. 8. In FIG. 8, the kanji indicator in the underside WH-DOS prompt is "For Oyamada", while the kanji indicator in the upper-side WH-DOS prompt is "Roman character". Further, in an Windows environment, the kanji indicator is "kana input".

As illustrated in FIG. 8, a WH-DOS prompt window is created each time double-clicking of the WH-DOS prompt icon shown in FIG. 9 is effected, with the result that a plurality of WH-DOS prompt windows exist. In the WH-DOS prompt, when "exit" is typed and a return key is pressed, that WH-DOS prompt window vanishes. This structure will be further described below with reference to FIG. 10.

Figure 10:
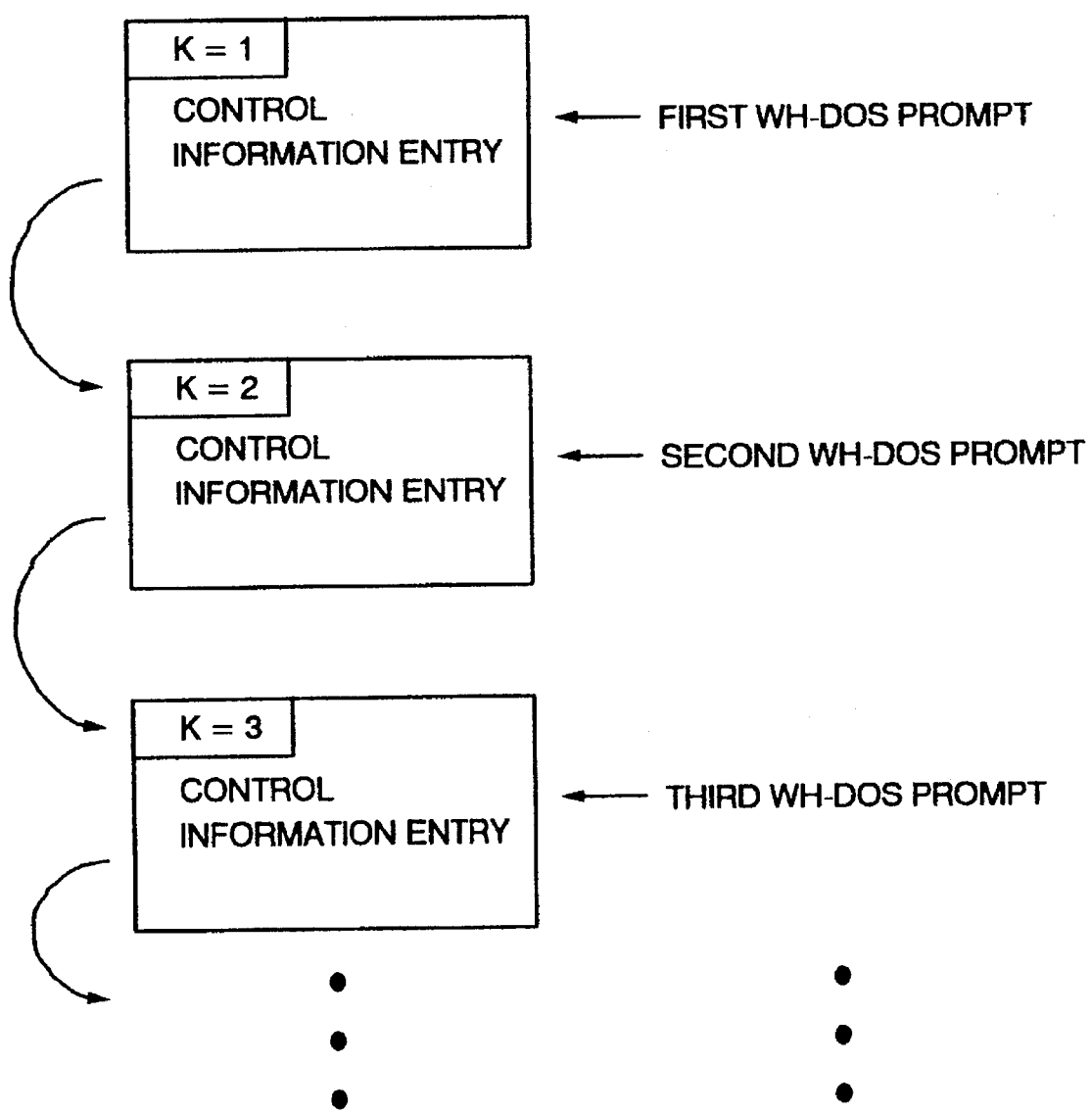
FIG. 10 is a diagram for explaining the creation of WH-DOS prompt windows.

In other words, when the WH-DOS prompt is created, the kana-kanji conversion program gives a uniform integer value to the WH-DOS prompt. (The uniform integer value is referred to as a kana-kanji control handle. In FIG. 10, the value is represented as k=1, but actually, it is not always a sequential number.) At the same time, the kana-kanji conversion program creates, in a system memory, a control table entry in which a memory is allocated and is looked up by the kana-kanji control handle. The contents of the table entry contain the contents shown in Table 1. Next, when another WH-DOS prompt is created, another control table entry is allocated in the system memory, and a pointer which indicates this new entry is set in the first control table entry. Further, if any one of the two WH-DOS prompts vanishes by "exit" being selected, the associated entry is released from the memory and a pointer indicating the released entry is updated so as to indicate an entry associated with another active WH-DOS prompt.

Windows, which is a non-preemptive OS, was described in the above-described embodiment. However, since OS/2 is a preemptive OS, the OS/2 has a higher degree of freedom. In an individual DOS prompt, a control panel similar to that of FIG. 4 is opened by, for example, pressing a control (CTRL) key and a kanji key at the same time, and a customization file can be reselected. Then, when entering into a kana-kanji conversion mode on that DOS prompt window, a newly-set customization file becomes valid.

In the foregoing, Windows and OS/2 were described. However, the present invention is not limited to the above-described OS, and can be also applied to any kana-kanji conversion system which uses a kana-kanji conversion program, such as X-Window system (trademark of MIT), ordinary MS-DOS, an ordinary word processor, or the like.

Further, in the above description, display information is displayed as it is. However, all of the display information or the necessary display information may first be displayed, and the display information in the selected customization file may be represented with reverse display.

Further, the present invention is not limited to use in a multi-window system, and can also be applied mainly to a character-based session of a single task, such as MS-DOS (trademark of Microsoft Inc.). This is because, even in MS-DOS, the kana-kanji conversion program can usually be customized by a user, and displaying the state of customization as an indicator is significant for the user.

Moreover, in the above-described embodiment, the indicator information is displayed in the lowermost line of a screen or window. However, in accordance with the present invention, the position where the indicator information is displayed is not limited to the above-described position, and the indicator information may be displayed at any arbitrary position which is not a hindrance to the display of an application program. Further, by designating display of the indicator information within the customization file, the indicator information may be displayed at a position which the user desires.

As described above, the customizing method of the present invention offers the effect that it makes it possible for a user to easily confirm a customization mode which is currently set, in a kana-kanji conversion system.

Further, the kana-kanji system of the present invention offers the effect that a kana-kanji system which allows a user to easily confirm a customization file which is currently set can be provided.

What is claimed is:

1. A method of customizing a kana-kanji conversion system including a processor unit and a display device connected to the processor unit and performing a kana-kanji conversion process, comprising the steps of:
   (a) preparing a plurality of customization files, each said customization file including customizing information of the kana-kanji conversion system and of display information corresponding to said customizing information;
   (b) enabling selection of one of said plurality of customization files;
   (c) enabling modification of at least a selected one of said customization files and of said display information of said customization file; and,
   (d) displaying said display information of said selected customization file at a predetermined position on a screen of said display.

2. The method as claimed in claim 1, wherein said customizing information includes information which specifies either kana input of Roman-character input.

3. The method as claimed in claim 1, wherein said display information includes information which identifies a person who effects customization.

4. The method as claimed in claim 1, wherein said step (c) comprises the steps of:
   enabling invoking and interactive editing of one of said plurality of customization files; and,
   enabling saving of edited contents as a new customization file.

5. A method of customizing a kana-kanji conversion system, said kana-kanja conversion system including a processor unit which can effect multi-window processing, and a display device which is connected to the processor unit and in which a multi-window is displayed by multi-window processing and said kana-kanji conversion system performing a kana-kanji conversion process, said method comprising the steps of:
   (a) preparing a plurality of customization files, each said customization file including customizing information of the kana-kanji conversion system and of display information corresponding to said customizing information;
   (b) enabling selection of one of said plurality of customization files in each window;
   (c) enabling modification of at least one of a selected said customization file and of said display information of said customization file in each window; and,
   (d) for each window, displaying said display information of said selected customization file at respective predetermined positions within the windows displayed in said display device.

6. The method as claimed in claim 5, wherein said display information includes information which identifies a person who effects customization.

7. The method as claimed in claim 5, wherein said step (c) comprises the steps of:
   enabling invoking and interactive editing of one of said plurality of customization files; and,
   enabling saving of edited contents as a new customization file.

8. The method as claimed in claim 7, wherein said step of invoking and interactive editing of one of said plurality of customization files is provided as an independent window session.

9. The method as claimed in claim 7, wherein said step of invoking and interactive editing of one of said plurality of customization files is provided as a dialog box within each window.

10. A kana-kanji conversion system including a processor unit capable fo performing a kana-kanji conversion process and a display device connected to the processor unit, and which can be customized by control processing of the processor unit, comprising:
   (a) means for storing a plurality of customization files, each of which includes customizing information of the kana-kanji conversion system and display information corresponding to said customizing information such that said plurality of customization files can be invoked;
   (b) means for selecting one of said plurality of customization files;
   (c) means for modifying at least a selected one of said customization files and of said display information of said customization file; and
   (d) means for displaying said display information of said selected customization file at a predetermined position of a screen of said display device.

11. The system as claimed in claim 10, wherein said display information includes information which identifies a person who effects customization.

12. A kana-kanji conversion system including a processor unit capable of effecting multi-window processing and a display device which is connected to the processor unit and at which a multi-window is displayed by multi-window processing, and said kana-kanji conversion system being able to customize by control processing of the processor unit, and comprising:

(a) means for storing a plurality of customization files each of which includes customizing information of the kana-kanji conversion system and of display information corresponding to said customizing information, such that said plurality of customization files can be invoked;

(b) means for enabling selection of one of said plurality of customization files in each said multi-window;

(c) means for modifying at least a selected one of said customization files and of said display information of said customization file in each said multi-window; and, (d) for each window, means for displaying said display information of said customization file at respective predetermined positions within said multi-windows displayed in said display device.

13. The system as claimed in claim 12, wherein said display information includes information which identifies a person who effects customization.

* * * * *